United States Patent
Kim et al.

(10) Patent No.: US 8,279,384 B2
(45) Date of Patent: Oct. 2, 2012

(54) SUBSTRATE FOR DISPLAY PANEL, LIQUID CRYSTAL DISPLAY PANEL HAVING THE SUBSTRATE, AND METHOD OF MANUFACTURING THE SAME

(75) Inventors: Hee-Seop Kim, Hwaseong-si (KR); Hwa-Sung Woo, Suwon-si (KR); Cheol Shin, Hwaseong-si (KR); Joo-Nyung Jang, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 699 days.

(21) Appl. No.: 12/411,549

(22) Filed: Mar. 26, 2009

(65) Prior Publication Data

US 2009/0284700 A1    Nov. 19, 2009

(30) Foreign Application Priority Data

May 15, 2008   (KR) .................... 10-2008-0044883

(51) Int. Cl.
*G02F 1/1337*    (2006.01)
*H01L 21/02*    (2006.01)

(52) U.S. Cl. ......................................... 349/123; 438/30
(58) Field of Classification Search .................. 349/48, 349/123, 125, 130, 139, 141
See application file for complete search history.

(56) References Cited

U.S. PATENT DOCUMENTS 6,466,288 B1 *  10/2002  Rho .............................. 349/141

FOREIGN PATENT DOCUMENTS

| | | |
|---|---|---|
| JP | 2002-139736 | 5/2002 |
| KR | 2002-0002651 | 1/2002 |
| KR | 2002-0088456 | 11/2002 |

* cited by examiner

*Primary Examiner* — Sarah Hahm
(74) *Attorney, Agent, or Firm* — Innovation Counsel LLP

(57) ABSTRACT

A substrate for a display panel includes a transparent electrode layer and an alignment layer. The transparent electrode layer is disposed on an insulating substrate, the transparent electrode layer being electrically floated. The alignment layer is disposed on the insulating substrate on which the transparent electrode layer is formed, and the alignment layer having a pre-tilt angle tilted about 85° to about 90° form the insulating substrate.

11 Claims, 8 Drawing Sheets

SUBSTRATE FOR DISPLAY PANEL, LIQUID CRYSTAL DISPLAY PANEL HAVING THE SUBSTRATE, AND METHOD OF MANUFACTURING THE SAME

PRIORITY STATEMENT

The present application claims priority under 35 U.S.C. §119 to Korean Patent Application No. 2008-44883, filed on May 15, 2008 in the Korean Intellectual Property Office (KIPO), the contents of which are herein incorporated by reference in their entirety.

BACKGROUND OF THE INVENTION

1. Field of the Invention

The present invention relates to a substrate for a display panel, a liquid crystal display (LCD) panel having the substrate, and a method of manufacturing the same.

2. Description of the Related Art

Generally, a liquid crystal display (LCD) apparatus includes a lower substrate, an upper substrate and a liquid crystal layer interposed between the substrates. In the LCD apparatus, liquid crystal molecules of the liquid crystal layer vary an arrangement thereof in response to a voltage difference between a common electrode of the upper substrate and a pixel electrode of the lower substrate, and thus the light transmittance thereof may be changed to display an image.

The liquid crystal molecules of the LCD apparatus have anisotropy so that the image display quality of the LCD apparatus varies based on a viewing angle. A conventional LCD apparatus has a narrower viewing angle than other types of display apparatuses. Therefore, in order to improve the viewing angle, a patterned vertical alignment (PVA) mode LCD apparatus and an electrically-induced optical compensation (EOC) mode LCD apparatus have been developed.

In the PVA mode LCD apparatus, a common electrode formed on an upper substrate and a pixel electrode formed on a lower substrate are patterned. During operation, different voltages are applied to the patterned common electrode and the patterned pixel electrode to form a multi-domain structure.

The EOC mode LCD apparatus includes a first substrate having two electrodes substantially in parallel with each other, a second substrate, vertical alignment layers that are formed on the first and second alignment layers, respectively, and a liquid crystal layer interposed between the first and second substrates and having positive dielectric anisotropy. When a voltage is applied to the two electrodes, an electric field of a horizontal direction is formed between the two electrodes so that liquid crystal molecules are driven by the electric field of the horizontal direction.

The potential energy of the liquid crystal with respect to the elastic energy of the liquid crystal is increased, as the driving voltage of the EOC mode LCD apparatus is increased. When the LCD panel is pressed, the liquid crystal at the texture portion of the pressed LCD panel lies down. After the pressure is lifted from the LCD panel, the liquid crystal of the texture portion maintains the lying-down state. Therefore, refractive index anisotropy may be increased at the texture portion to display a yellowish image.

SUMMARY OF THE INVENTION

The present invention provides a substrate for a display panel capable of improving image display quality.

The present invention also provides a method of manufacturing the substrate.

The present invention also provides a liquid crystal display (LCD) panel having the substrate.

The present invention also provides a method of manufacturing the LCD panel.

In an example according to the present invention, a substrate for a display panel includes a transparent electrode layer and an alignment layer. The transparent electrode layer is disposed on an insulating substrate, the transparent electrode layer being electrically floated. The alignment layer having a pre-tilt angle tilted about 85° to about 90° is disposed on the insulating substrate on which the transparent electrode layer is formed.

In an example method of manufacturing the second substrate according to the present invention, a transparent electrode layer is formed on an insulating substrate, the transparent electrode layer is electrically floated. An alignment layer having a pre-tilt angle tilted about 85° to about 90° is formed on the insulating substrate on which the color filter layer is formed.

In an example according to the present invention, an LCD panel includes a first substrate, a second substrate, and a liquid crystal layer. The first substrate includes a first pixel electrode having a plurality of first electrode bars and a second pixel electrode having a plurality of second electrode bars disposed between the first electrode bars disposed on a first insulating substrate. The second substrate opposes the first substrate and includes a transparent electrode layer disposed on a second insulating substrate to be electrically floated and an alignment layer disposed on the transparent electrode layer to have a pre-tilt angle tilted about 85° to about 90°. The liquid crystal layer is disposed between the first substrate and the second substrate.

In an example method of manufacturing the LCD panel according to the present invention a first substrate including a first pixel electrode and a second pixel electrode disposed on a first insulating substrate is formed. The first pixel electrode includes a plurality of first electrode bars and the second pixel electrode includes a plurality of second electrode bars disposed between the first electrode bars. A second substrate including a transparent electrode layer disposed on a second insulating substrate opposing the first substrate is formed The transparent electrode layer is electrically floated, and an alignment layer is disposed on the transparent electrode layer. A liquid crystal layer including a reactive mesogen is formed between the first substrate and the second substrate. A pre-tilt angle of about 85° to about 90° is formed in an alignment layer of the first substrate and the second substrate. The pre-tilt angle is formed by irradiating the light when the liquid crystal is driven to display a white image.

Accordingly, although the LCD panel is pressed, the liquid crystal may be easily restored to the original position to prevent the formation of spots and improve image quality. An alignment layer may have a pre-tilt angle corresponding to the liquid crystal alignment of a white image to improve the response time of the liquid crystal.

BRIEF DESCRIPTION OF THE DRAWINGS

The above and other advantages of the present invention will become more apparent by describing in detail example embodiments thereof with reference to the accompanying drawings, in which.

DETAILED DESCRIPTION OF THE INVENTION

Figure 1:
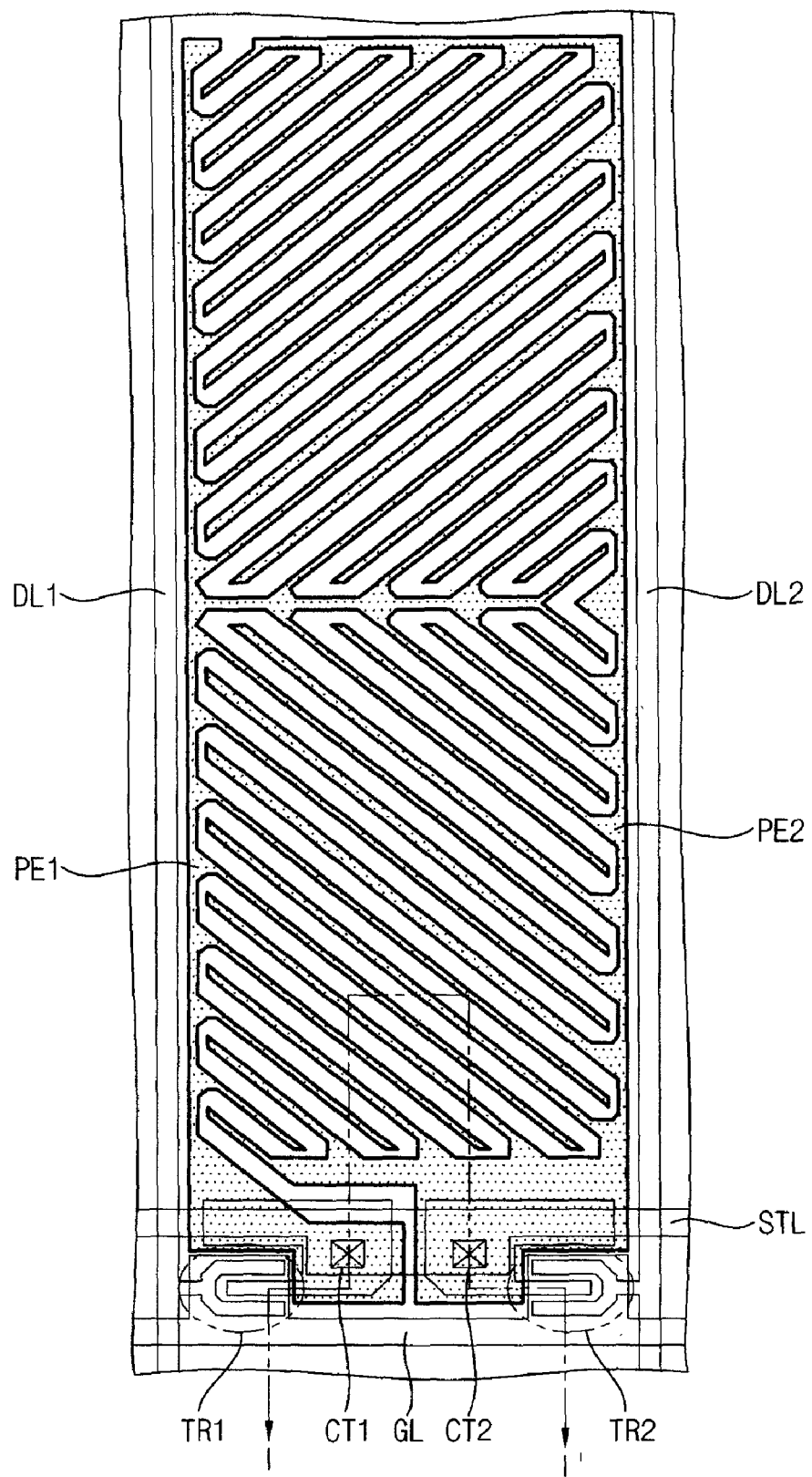
FIG. 1 is a plan view illustrating a liquid crystal display (LCD) panel in accordance with one embodiment 1 of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Embodiment 1

Figure 2:
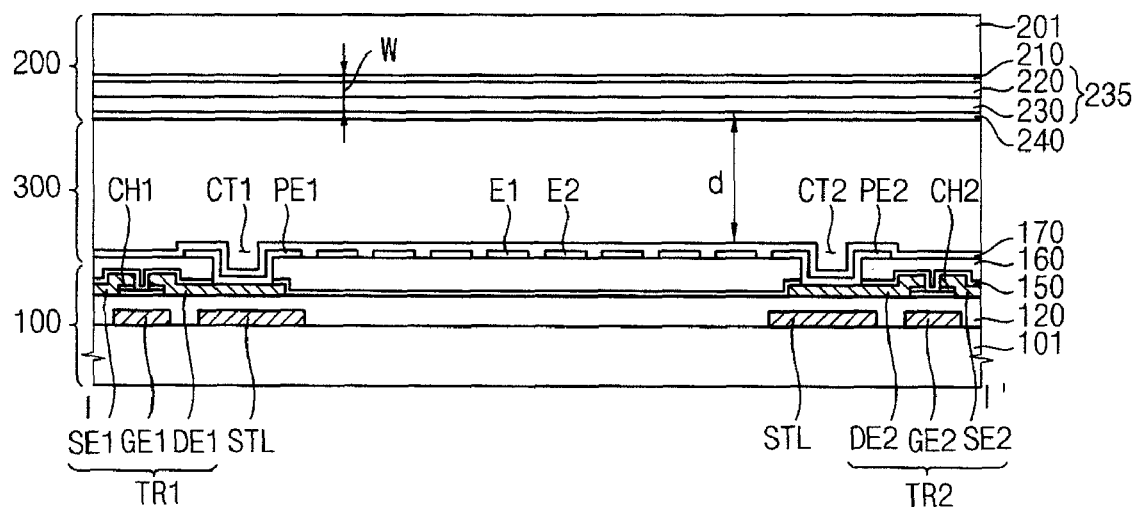
FIG. 2 is a cross-sectional view taken along a line I-I' shown in FIG. 1.

FIG. 1 is a plan view illustrating a liquid crystal display (LCD) panel in accordance with one embodiment of the present invention. FIG. 2 is a cross-sectional view taken along a line I-I' shown in FIG. 1.

Referring to FIGS. 1 and 2, the LCD panel includes a first substrate 100, a second substrate 200 and a liquid crystal layer 300.

The first substrate 100 includes a first insulating substrate 101 having a pixel area, a gate line GL, a first data line DL1, a second data line DL2, a storage line STL, a first switching element TR1, a second switching element TR2, a first pixel electrode PE1, a second pixel electrode PE2, and a first alignment layer 170, disposed thereon.

The gate line GL extends in a first direction, and the first and second data lines DL1 and DL2 extend in a second direction crossing the first direction to be adjacent each other. The storage line STL extends in the first direction to be formed in the pixel area P, and adjacent to the gate line GL.

The first switching element TR1 is disposed adjacent to an area in which the gate line GL and the first data line DL1 cross each other. The first switching element TR1 includes a gate electrode GE1 connected to the gate line GL, a source electrode SE1 connected to the first data line DL1, and a drain electrode DE1 electrically connected to the first pixel electrode PE1 through a first contact part CT1.

The second switching element TR2 is disposed adjacent to an area in which the gate line GL and the second data line DL2 cross each other. The second switching element TR2 includes a gate electrode GE2 connected to the gate line GL, a source electrode SE2 connected to the second data line DL2, and a drain electrode DE connected to the second pixel electrode PE2 through a second contact part CT2. The first and second switching elements TR1 and TR2 further include a first channel pattern CH1 and a second channel pattern CH2, respectively.

The first pixel electrode PE1 and the second pixel electrode PE2 are disposed in the pixel area P to receive first and second voltages having the potential difference, respectively. The first pixel electrode PE1 has a plurality of first electrode bars E1, and the second pixel electrode PE2 has a plurality of second electrode bars E2. The second electrode bars E2 are alternately disposed between the first electrode bars E1.

The first electrode bars E1 receive a data voltage of a first polarity (+) applied from the first data line DL1 through the first switching element TR1 to have the first polarity. The second electrode bars E2 receive a data voltage of a second polarity (−) applied from the second data line DL2 through the second switching element TR2 to have the second polarity. For example, the first and second electrode bars E1 and E2 are disposed on the same plane so that a horizontal electric field is formed in the pixel area P by the potential difference of the first and second electrode bars E1 and E2.

The first alignment layer 170 is disposed on the first insulating substrate 101 having the first and second electrode bars E1 and E2. The first alignment layer 170 has a pre-tilt angle corresponding to a direction in which liquid crystal is aligned when the LCD panel displays a white image.

For example, the pre-tilt angle is about 85° to about 90° and preferably 90°. The pre-tilt angle is preferably 90° for a contrast ratio and a manufacturing process, and preferably under 90° for the response time. Thus, the first alignment layer 170 tilts the liquid crystal to the pre-tilt angle to vertically align the liquid crystal without an electric field.

A method of forming the pre-tilt angle in the first alignment layer 170 may employ various methods. For example, a photoalignment method, a rubbing method, a reactive mesogen (RM) method, etc, may be used. The photoalignment method uses an ultraviolet (UV) light or a laser to form the pre-tilt angle on a photoalignment layer. The photoalignment layer is disposed on the first insulating substrate 101 having the first and second electrodes E1 and E2. The photoalignment layer is irradiated by using a UV light or a laser to form the pre-tilt angle on the photoalignment layer. The RM method uses the RM to form the pre-tilt angle on the alignment layer. The liquid crystal layer 300 includes the RM to display the white image. The RM of the liquid crystal layer 300 is then hardened by using a UV light to form the pre-tilt angle on the alignment layer.

The first substrate 100 may further include a gate insulation layer 120, a protective insulating layer 150, and the organic layer 160. The first substrate 100 further includes a blocking layer (not shown) disposed on the organic layer 160 corresponding to area in which the first and second data lines DL1 and DL2, the storage line STL, the first switching element TR1, and the second switching element TR2 are formed.

The second substrate 200 includes the second insulating substrate 201. A transparent electrode layer 210, a dielectric layer 235, and a second alignment layer 240 are disposed on the second insulating substrate 201. The dielectric layer 235 is comprised of a dielectric substance and for example, includes a color filter layer 220 and an overcoating layer 230. A thickness W of the dielectric layer 235 may be 0 μm and more when a cell gap d of the liquid crystal layer 300 is larger than 3 μm. The thickness W of the dielectric layer 235 may be larger than (3-d)μm when a cell gap d of the liquid crystal layer 300 is 3 μm and less. The thickness W of the dielectric layer 235 may be 0 μm when a cell gap d of the liquid crystal layer 300 is larger than 3 μm.

The transparent electrode layer 210 is formed into a single pattern on the entire second insulating substrate 201 to have an electrically floating structure. The transparent electrode layer 210 does not receive a driving voltage.

The color filter layer 220 is disposed on the transparent electrode layer 210 corresponding to the pixel area P. The color filter layer 220 includes red, green, and blue color filters.

The overcoating layer 230 is disposed on the second insulating substrate 201 having the color filter layer 220 to flatten the second substrate 200.

The second alignment layer 240 has a pre-tilt angle corresponding to a direction in which liquid crystal is aligned when the LCD panel displays a white image. For example, the pre-tilt angle is about 85° to about 90° and preferably 90°. The pre-tilt angle is preferably 90° for a contrast ratio and a manufacturing process, and preferably under 90° for the response time. Thus, the second alignment layer 240 tilts the liquid crystal to the pre-tilt angle to vertically align the liquid crystal without an electric field.

The liquid crystal layer 300 includes a positive birefringence liquid crystal. The liquid crystal layer 300 has a normally black mode in which the liquid crystal layer 300 displays a black image without the electric field and a white image when the electric field is applied. The liquid crystal layer 300 is aligned corresponding to the liquid crystal alignment of the white image without the electric field due to the pre-tilt angle of the first and second alignment layers 170 and 240.

For example, the liquid crystal layer 300 is vertically aligned without the electric field to block the light, and tilted by the horizontal electric field between the first and second electrode bars E1 and E2 in the electric field to transmit the light.

The liquid crystal is vertically aligned between the first and second electrodes, so that a black line is displayed between the first and second electrodes. The black line displayed between the first and second electrodes is a texture. After the pressure is lifted from the liquid crystal of the texture, the liquid crystal of the texture may not return to the vertical alignment. Thus, a portion formed the texture is luminous in comparison with other portions of the LCD panel to display spots.

According to the embodiment of the present invention, the second substrate 200 includes the transparent electrode layer 210 having an electrically floating structure so that the texture may not be formed between the first and second electrodes E1 and E2. Thus, the LCD panel of the embodiment may prevent the formation of spots. A spot occurs when the vertical alignment of the liquid crystal is not restored after the pressure is lifted.

In addition, the second substrate 200 includes the transparent electrode layer 210 having the floating structure to reduce the response time of the liquid crystal. However, the first and second alignment layers 170 and 240 have the pre-tilt angle to improve the response time of the liquid crystal.

Therefore, the LCD panel of the embodiment may improve the image display quality and the response time.

Figure 3:
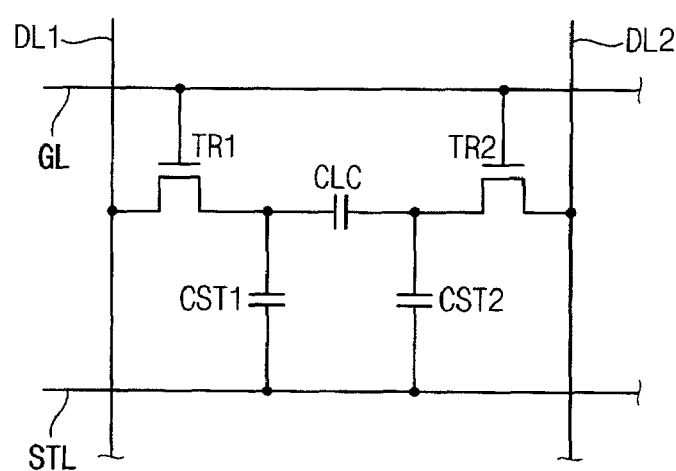
FIG. 3 is an equivalent circuit diagram illustrating the LCD panel in FIG. 1.

FIG. 3 is an equivalent circuit diagram illustrating the LCD panel in FIG. 1.

Referring to FIGS. 1 and 3, a pixel unit Pu is formed in the pixel area P of the LCD panel. The pixel unit Pu is driven by a data signal and a gate signal transmitted through data lines DL1 and DL2, and a gate line GL. For example, the pixel unit Pu includes a first switching element TR1, a second switching element TR2, a liquid crystal capacitor CLC, a first storage capacitor CST1, and a second storage capacitor CST2. The first switching element TR1 includes a control electrode (hereinafter referred to as 'gate electrode') connected to the gate line GL, an input electrode (hereinafter referred to as 'source electrode') connected to a first data line DL 1, and an output electrode (hereinafter referred to as 'drain electrode') connected to a first end of the liquid crystal capacitor CLC. The second switching element TR2 includes a gate electrode connected to the gate line GL, a source electrode connected to a second data line DL2, and a drain electrode connected to a second end of the liquid crystal capacitor CLC.

The first and second data lines DL1 and DL2 receive data signals of dual polarity corresponding to the pixel unit Pu. For example, the first data line DL1 receives a data signal of a positive polarity (+), and the second data line DL2 receives a data signal of a negative polarity (−). Thus, the pixel unit Pu receives the data signals of the positive polarity (+) and the negative polarity (−) to drive the liquid crystal capacitor at a high voltage. The dual polarity driving mode may improve a response time and transmissivity.

Figure 4A:
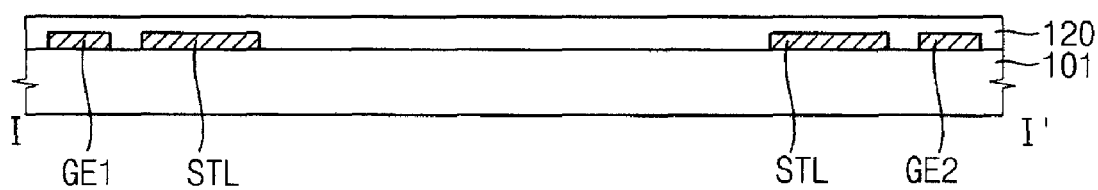
FIGS. 4A to 4C are cross-sectional views illustrating a process for manufacturing the first substrate in FIG. 2.
Figure 4B:
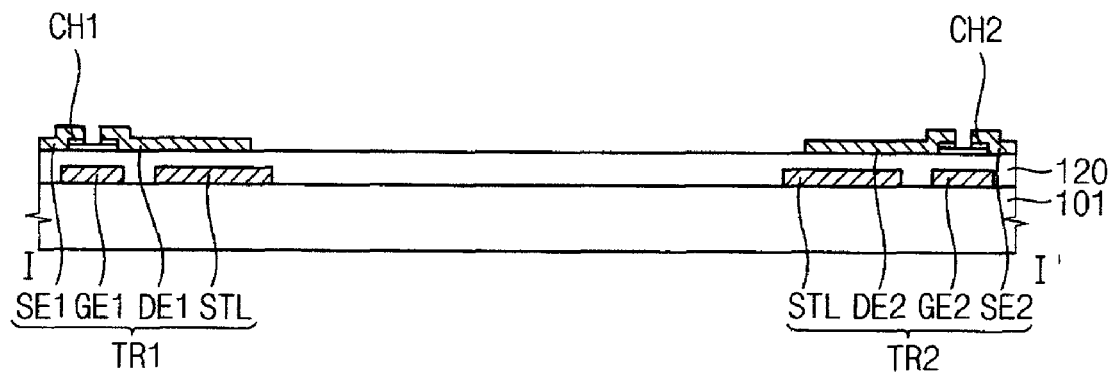
Figure 4C:
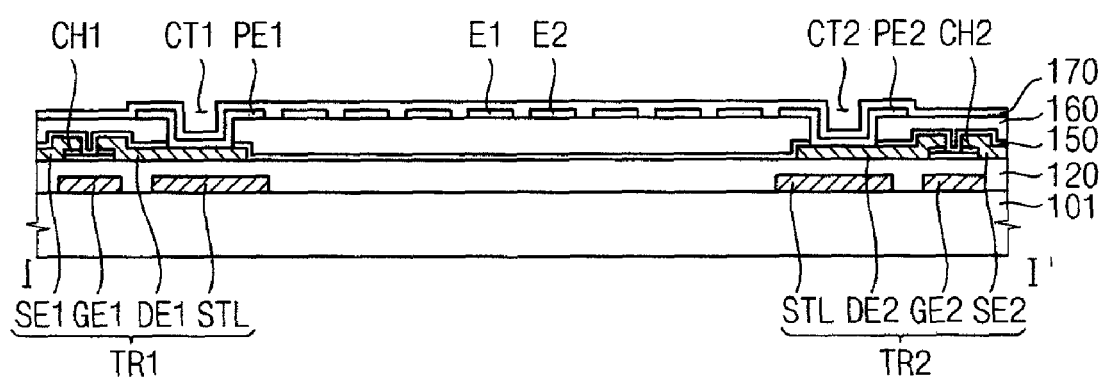

FIGS. 4A to 4C are cross-sectional views illustrating a process for manufacturing the first substrate in FIG. 2.

Referring to FIGS. 2 and 4A, a gate metal layer is formed on the first insulating substrate 101. The gate metal layer is patterned to form a gate metal pattern including the gate line GL, the gate electrodes GE1 and GE2, and the storage line STL.

A gate insulation layer 120 is formed on the first insulating substrate 101 on which the gate metal pattern is formed.

Referring to FIGS. 2 and 4B, channel patterns CH1 and CH2 are formed on the first insulating substrate on which the gate insulation layer 120 is formed. A source metal layer is formed on the first insulating substrate 101 on which the channel patterns CH1 and CH2 are formed. The source metal layer is patterned to form a source metal pattern including the first and second data lines DL1 and DL2, the source electrodes SE1 and SE2, and the drain electrodes DE1 and DE2.

Herein, the channel patterns CH1 and CH2 and the source metal pattern are formed by using the different masks. However, the channel patterns CH1 and CH2 and the source metal pattern may be formed by using the same mask.

Referring to FIGS. 2 and 4C, a protective insulating layer 150 is formed on the first insulating substrate 101 on which the source metal pattern is formed. An organic layer 160 is formed on the first insulating substrate 101 on which the protective insulating layer 150 is formed.

The organic layer 160 and the protective insulating layer 150 are etched to form first and second contact parts CT1 and CT2 to expose the drain electrodes DE1 and DE2. A transparent conductive layer is formed on the first insulating substrate 101 on which the first and second contact parts CT1 and CT2 are formed. The transparent conductive layer is patterned to form the first and second pixel electrodes PE1 and PE2. The first and second pixel electrodes PE1 and PE2 are electrically connected to the drain electrodes DE1 and DE2 through the first and second contact parts CT1 and CT2. The first and second pixel electrodes PE1 and PE2 are patterned into a plurality of bars, and include a plurality of first electrode bars E1 and a plurality of second electrode bars E2, respectively.

A first alignment layer 170 is formed on the first insulating substrate 101 on which the first and second pixel electrodes PE1 and PE2 are formed. The first alignment layer 170 has the pre-tilt angle corresponding to the liquid crystal alignment of the white image by using the photoalignment method, the rubbing method, etc. For example, the pre-tilt angle is about 85° to about 90° and preferably 90°. The pre-tilt angle is preferably 90° for a contrast ratio and a manufacturing process, and preferably under 90° for the response time.

Figure 5A:
FIGS. 5A and 5B are cross-sectional views illustrating a process for manufacturing the second substrate in FIG. 2.
Figure 5B:
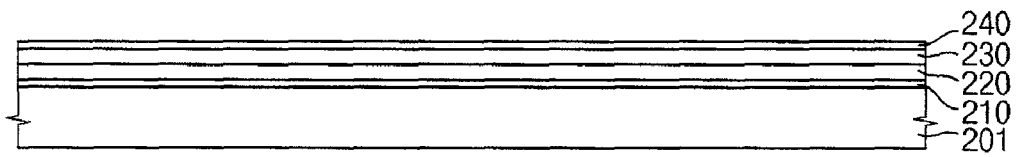

FIGS. 5A and 5B are cross-sectional views illustrating a process for manufacturing the second substrate in FIG. 2.

Referring to FIGS. 2 and 5A, the transparent electrode layer 210 is formed on the second insulating substrate 201. The transparent electrode layer 210 is formed into a single pattern on the entire second insulating substrate 201 to have an electrically floating structure.

Referring to FIGS. 2 and 5B, the color filter layer 220 is formed on the second insulating substrate 201 on which the transparent electrode layer 210 is formed. The color filter layer 220 is formed in the pixel area. Color filter layers of red, green, and blue are formed in pixel areas of red, green and blue, respectively.

The overcoating layer 230 is formed on the second insulating substrate 201 on which the color filter layer 220 is formed. The overcoating layer 230 is formed on the color filter layer 220 to compensate the step of the color filter layer 220. The overcoating layer 230 flattens the second first substrate 200. The overcoating layer 230 may be formed to a thickness of about 2 μm.

The second alignment layer 240 is formed on the second insulating substrate 201 on which the overcoating layer 230 is formed. The second alignment layer 240 has the pre-tilt angle corresponding to the liquid crystal alignment of the white image by using the photoalignment method, the rubbing method, etc. For example, the pre-tilt angle is about 85° to about 90° and preferably 90°. The pre-tilt angle is preferably 90° for a contrast ratio and a manufacturing process, and preferably under 90° for the response time.

Figure 6:
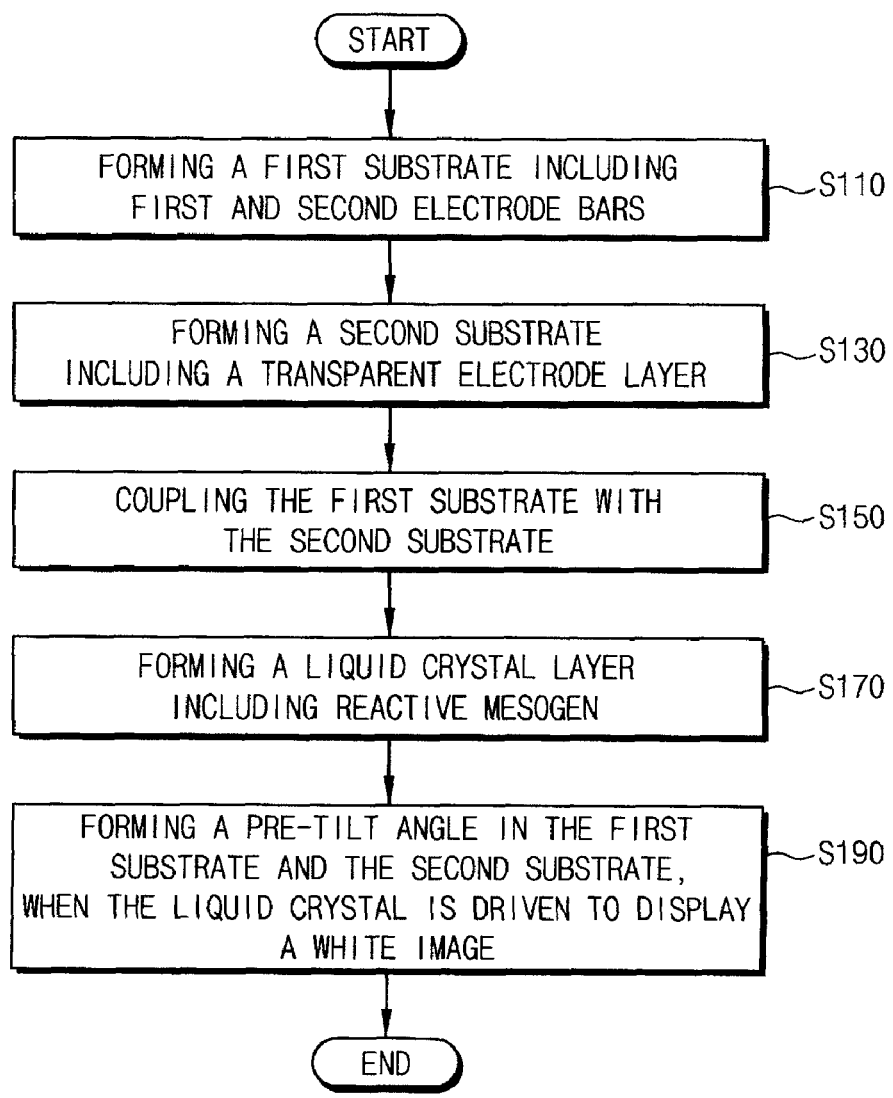
FIG. 6 is a flowchart illustrating a process for manufacturing the LCD panel in FIG. 2.

FIG. 6 is a flowchart illustrating a process for manufacturing the LCD panel in FIG. 2.

Referring to FIGS. 4A, 4B, 4C and 6, the first substrate 100 is manufactured (step S110). The first substrate 100 includes the first substrate 101, the first pixel electrode PE1 having the first electrode bars E1 disposed on the first substrate 101, and the second pixel electrode PE2 having the second electrode bars E2 disposed between the first electrode bars.

Referring to FIGS. 5A, 5B and 6, the second substrate 200 is manufactured (step S130). The second substrate 200 includes the second insulating substrate 201, the transparent electrode layer 210 having an electrically floating structure disposed on the second insulating substrate 201, and the color filter layer 220 disposed on the transparent electrode layer 210.

Referring to FIGS. 2 and 6, the first substrate 100 is coupled with the second substrate 200 by using the sealant (not shown) (step S150). The liquid crystal layer 300 is disposed between the first substrate 100 and the second substrate 200 (step S170). The liquid crystal layer 300 includes the liquid crystal and the RM.

The LCD panel in which the liquid crystal layer 300 is disposed is driven to display the white image, and the LCD panel is irradiated by a UV light to harden the RM. The pre-tilt angle corresponding to the liquid crystal alignment of the white image is formed in the alignment layers of the first substrate 100 and the second substrate 200 by the RM (step S190).

Hereinafter, a plurality of samples of various LCD panels according to a first embodiment was manufactured, and the liquid crystal alignments of the samples were compared in a horizontal electric field.

A conventional LCD panel of sample 1 included a second substrate in which a transparent electrode layer was not disposed. An LCD panel of sample 2 according to the embodiment included a second substrate in which a transparent electrode layer having the floating structure was disposed. An LCD panel of sample 3 according to the embodiment further included the alignment layer having a pre-tilt angle in comparison with sample 2.

The first and second electrode bars formed the LCD panels of samples 1, 2 and 3 received the data signals of the positive (+) and negative (−) polarity, so that the horizontal electric field was formed in the LCD panels of samples 1, 2 and 3, respectively. The liquid crystal layers of samples 1, 2 and 3 were aligned as shown in FIGS. 7 to 9.

Figure 7:
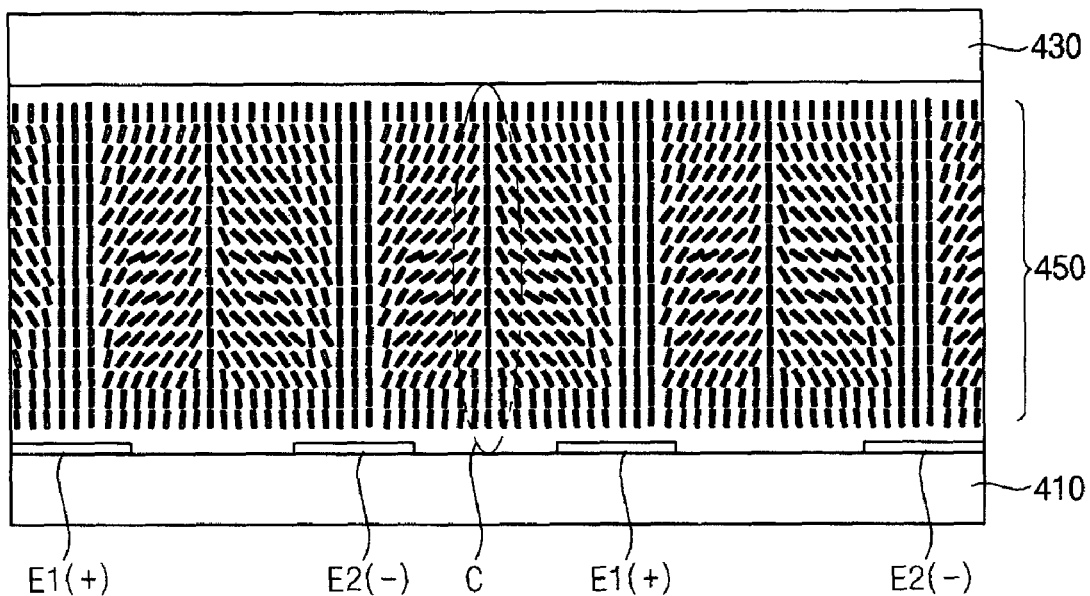
FIGS. 7 to 9 are cross-sectional views illustrating LCD panels in accordance with another embodiment of the present invention.
Figure 8:
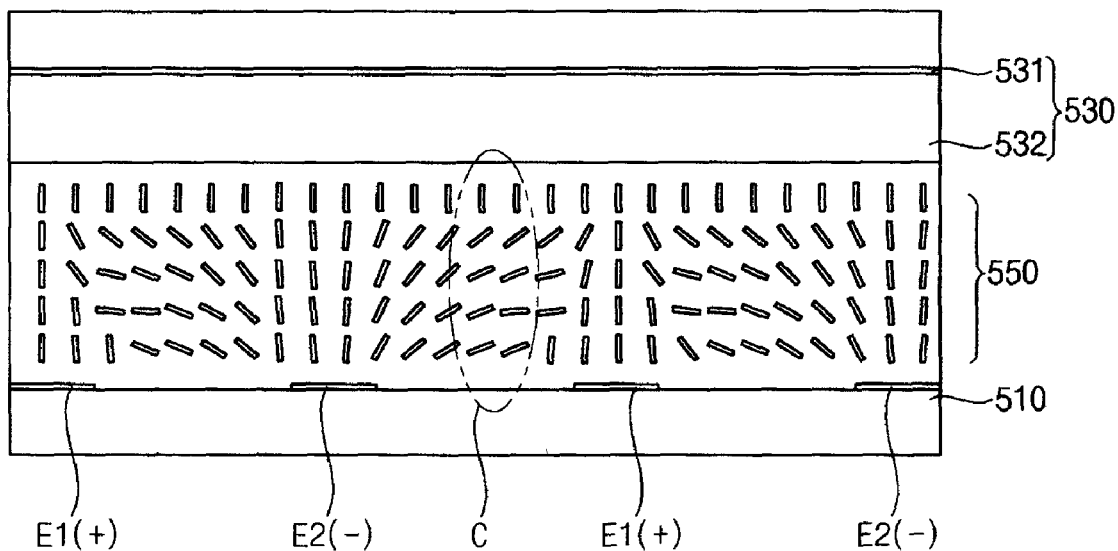
Figure 9:
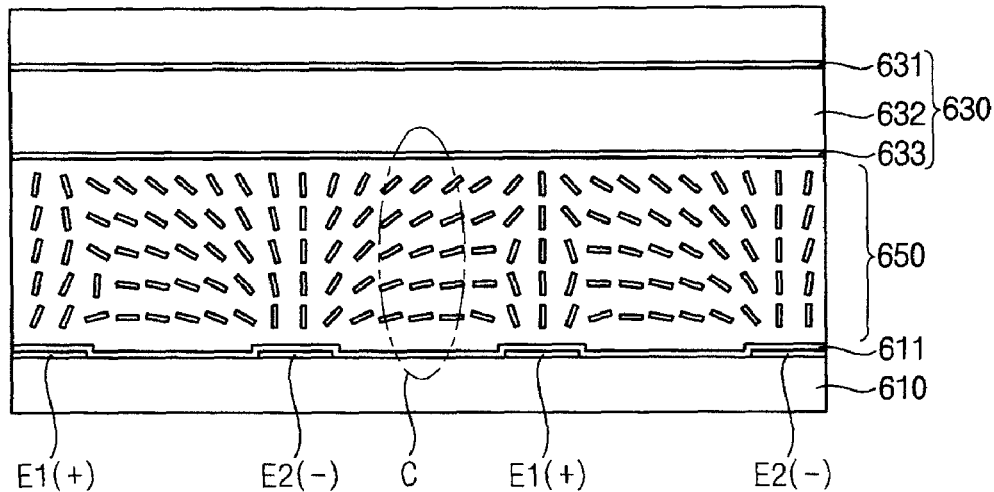

FIGS. 7 to 9 are cross-sectional views illustrating an LCD panel in accordance with another embodiment of the present invention.

Referring to FIG. 7, the LCD panel 400 was manufactured to include a first substrate 410, first and second electrode bars E1 and E2, a second substrate 430 coupled with the first substrate 410, and a liquid crystal layer 450 disposed between the first substrate 410 and the second substrate 430. The transparent electrode layer was not formed in the second substrate 430.

In the horizontal electric field, the liquid crystal of the liquid crystal layer 450 was vertically aligned in areas in which the first electrode bars E1 were formed and the second electrode bars E2 were formed. Also, the liquid crystal of the liquid crystal layer 450 was vertically aligned in a central portion C between the first and second electrode bars E1 and E2. The liquid crystal disposed in an area between the first electrode bars E1 and the central portion C was tilted toward the central portion C.

Thus, when the transparent electrode layer was not formed in the second substrate 430, the texture having vertically aligned liquid crystal was formed on the central portion C between the first and second electrode bars E1 and E2.

When the LCD panel 400 is pressed, the liquid crystal of the texture portion lies down to transmit the light. After the pressure is lifted from the LCD panel 400, the liquid crystal of the texture portion may not return to the vertical alignment and maintain a lying-down state. Thus, the texture portion may be brightly displayed to cause a yellowish image.

Referring to FIG. 8, the LCD panel 500 was manufactured to include a first substrate 510, first and second electrode bars E1 and E2, a second substrate 530 coupled with the first substrate 510, and a liquid crystal layer 550 disposed between the first substrate 510 and the second substrate 530. The second substrate 530 included a transparent electrode layer 531 having an electrically floating structure and the color filter layer 532.

In the horizontal electric field, the liquid crystal of the liquid crystal layer 550 was vertically aligned in areas in which the first electrode bars E1 were formed and the second electrode bars E2 were formed.

However, the liquid crystal of the liquid crystal layer 550 was tilted in a central portion C between the first and second electrode bars E1 and E2, which is differently aligned from the liquid crystal of sample 1.

When the transparent electrode layer was formed in the second substrate 530, the texture that the liquid crystal that was vertically aligned was not formed on the central portion C between the first and second electrode bars E1 and E2 as shown in FIG. 7.

Thus, the texture was not formed at the LCD panel 500 of sample 2, thereby preventing a yellowish image.

The response time of the LCD panel 500 was reduced to about 30 ms by the second substrate having the transparent electrode layer of floating structure.

Referring to FIG. 9, an LCD panel of sample 3 further included the alignment layer 633 having the pre-tilt angle in comparison with the LCD panel of sample 2. The pre-tilt angle corresponds to the liquid crystal alignment in driving of the LCD panel to display a white image.

In the horizontal electric field, the liquid crystal of the liquid crystal layer 650 was vertically aligned in areas in which the first electrode bars E1 were formed and the second electrode bars E2 were formed. However, the liquid crystal of the liquid crystal layer 650 was tilted in a central portion C between the first and second electrode bars E1 and E2. When the transparent electrode layer was formed in the second substrate 630 as sample 2, the texture was not formed on the central portion C between the first and second electrode bars E1 and E2 thereby preventing a yellowish image.

The response time of the LCD panel 600 was detected to be about 18 ms. In comparison with sample 2, the response time of the LCD panel 600 improved by about 40% by the alignment layer having the pre-tilt angle.

Embodiment 2

Figure 10:
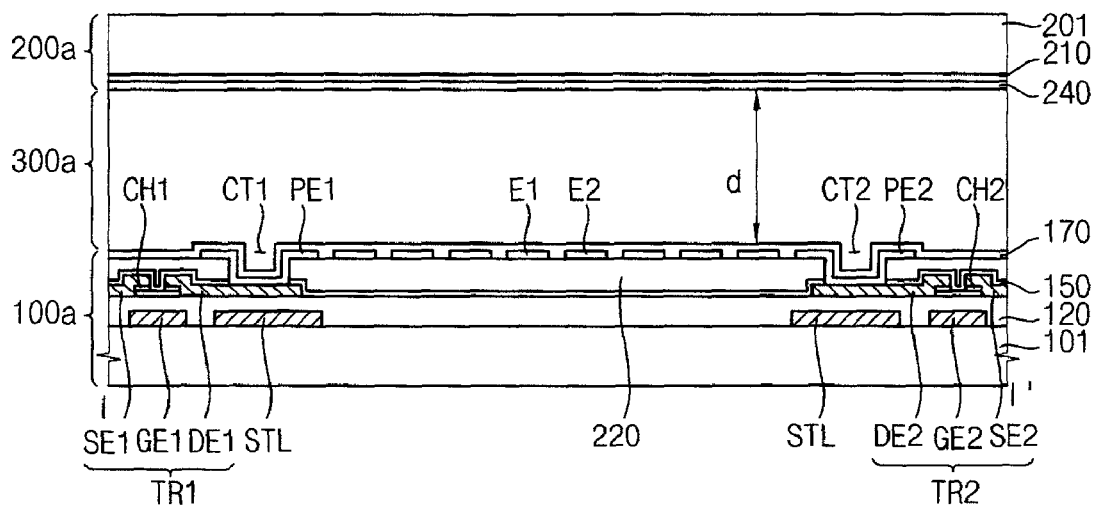
FIG. 10 is a cross-sectional view illustrating a liquid crystal display (LCD) panel in accordance with one embodiment 2 of the present invention.

FIG. 10 is a cross-sectional view illustrating a liquid crystal display (LCD) panel in accordance with a second embodiment of the present invention. Hereinafter, the same reference numerals will be used to refer to the same or like parts as those described in the first embodiment, and any further repetitive explanation concerning the above elements will be omitted.

Referring to FIGS. 1 and 10, the LCD panel includes a first substrate 110a, a second substrate 200a and a liquid crystal layer 300a.

The first substrate 100a includes a first insulating substrate 101, and a color filter layer 220 disposed on the first insulating substrate 101. For example, the color filter 220 is disposed on the first insulating substrate 101 on which a gate line GL, a first data line DL1, a second data line DL2, a storage line STL, a first switching element TR1, and a second switching element TR2 formed. A first pixel electrode PE1, a second electrode PE2, and a first alignment layer 170 are disposed on the color filter layer 220.

The second substrate 200a includes an insulating substrate 201, a transparent electrode layer 210, and a second first alignment layer 240. The transparent electrode layer 210 is formed into a single pattern on the entire second insulating substrate 201 to have an electrically floating structure. The transparent electrode layer 210 does not receive a driving voltage.

The liquid crystal layer 300a is vertically aligned without the electric field to block the light, and tilted by the horizontal electric field between the first and second electrode bars E1 and E2 in the electric field to transmit the light. A cell gap d of the liquid crystal layer 300a is about 6 μm.

The first and second alignment layers 170 and 240 have the pre-tilt angle. For example, the pre-tilt angle is about 85° to about 90° and preferably 90°. The pre-tilt angle is preferably 90° for a contrast ratio and a manufacturing process, and preferably under 90° for the response time.

Hereinafter, a method of manufacturing the first substrate 100a will be simply described, referring to FIGS. 4A to 4C.

Referring to FIGS. 4A, 4B and 10, a gate metal layer is formed on the first insulating substrate 101. The gate metal layer is patterned to form a gate metal pattern including the gate line GL, the gate electrodes GE1 and GE2, and the storage line STL.

A gate insulation layer 120 is formed on the first insulating substrate 101 on which the gate metal pattern is formed. Channel patterns CH1 and CH2 are formed on the first insulating substrate on which the gate insulation layer 120 is formed. A source metal layer is formed on the first insulating substrate 101 on which the channel patterns CH1 and CH2 are formed. The source metal layer is patterned to form a source metal pattern including the first and second data lines DL1 and DL2, the source electrodes SE1 and SE2, and the drain electrodes DE1 and DE2. Herein, the channel patterns CH1 and CH2 and the source metal pattern are formed by using the different masks. However, the channel patterns CH1 and CH2 and the source metal pattern may be formed by using the same mask.

Referring to FIGS. 4C and 10, a protective insulating layer 150 is formed on the first insulating substrate 101 on which the source metal pattern is formed. A color filter layer 220 is formed on the first insulating substrate 101 on which the protective insulating layer 150 is formed. The color filter layer 220 and the protective insulating layer 150 are etched to form first and second contact parts CT1 and CT2 to expose the drain electrodes DE1 and DE2. A transparent conductive layer is formed on the first insulating substrate 101 on which the first and second contact parts CT1 and CT2 are formed. The transparent conductive layer is patterned to form the first and second pixel electrodes PE1 and PE2. The first and second pixel electrodes PE1 and PE2 are electrically connected to the drain electrodes DE1 and DE2 through the first and second contact parts CT1 and CT2. The first and second pixel electrodes PE1 and PE2 are patterned into a plurality of bars and include a plurality of first electrode bars E1 and a plurality of second electrode bars E2, respectively. A first alignment layer 170 is formed on the first insulating substrate 101 on which the first and second pixel electrodes PE1 and PE2 are formed.

Hereinafter, a method of manufacturing the second substrate 200a will be described with reference to FIG. 5A.

Referring to FIGS. 5A and 10, the transparent electrode layer 210 is formed on the second insulating substrate 201. The transparent electrode layer 210 is formed into a single pattern on the entire second insulating substrate 201 to have an electrically floating structure. The second alignment layer 240 is formed on the second insulating substrate 201 on which the transparent electrode layer 210 is formed.

A method of manufacturing the LCD panel according to the second embodiment is substantially the same as the method of the first embodiment, and any further repetitive explanation concerning the method of manufacturing the LCD panel will be omitted.

Hereinafter, a plurality of samples of various LCD panels according to the second embodiment was manufactured, and the liquid crystal alignments of the samples were compared in a horizontal electric field.

An LCD panel of sample 4 according to the embodiment included a liquid crystal layer having a cell gap d of about 6 μm and a second substrate not having a dielectric layer disposed between a transparent electrode layer and the liquid crystal layer. An LCD panel of sample 5 according to the embodiment included the liquid crystal layer having a cell gap d of about 3 μm and a second substrate not having a dielectric layer disposed between a transparent electrode layer and the liquid crystal layer.

Figure 11:
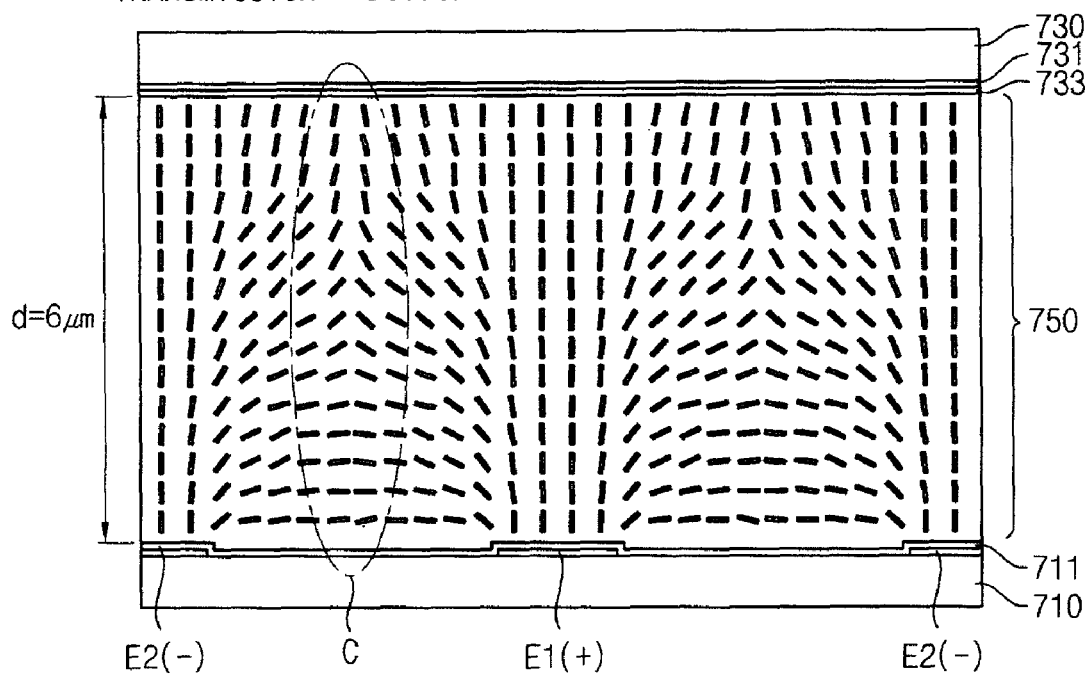
FIGS. 11 and 12 are cross-sectional views illustrating LCD panels in accordance with another embodiment of the present invention.
Figure 12:
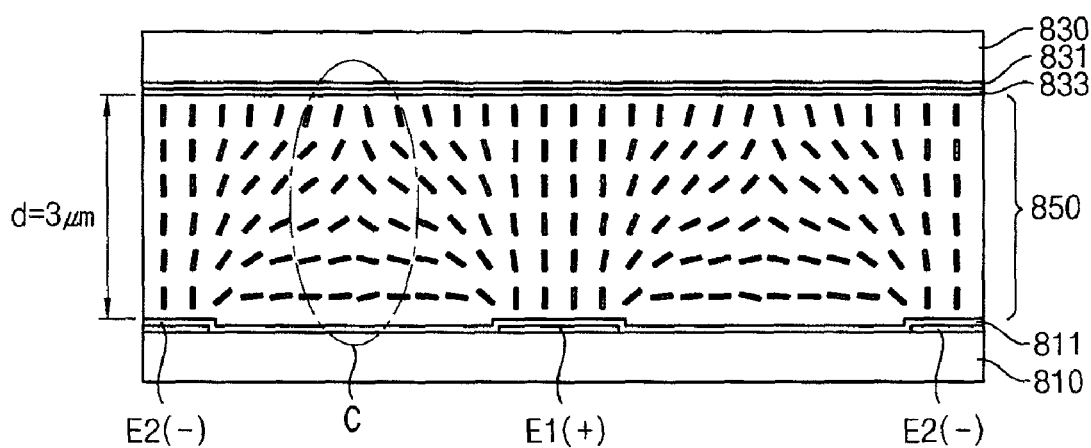

FIGS. 11 and 12 are cross-sectional views illustrating LCD panels in accordance with another embodiment of the present invention.

Referring to FIG. 11, the LCD panel 700 of the sample 4 included a first substrate 710, a second substrate 730 opposite to the first substrate 710, and a liquid crystal 750. The first substrate 710 included first and second electrode bars E1 and E2 and a first alignment layer 711. The second substrate 730 included a transparent electrode layer 731 having an electrically floating structure and a second alignment layer 733. The liquid crystal 750 had a cell gap of about 6 μm. The first and second alignment layer 711 and 733 had a thickness of about 0.1 μm, respectively.

In the horizontal electric field, the liquid crystal of the liquid crystal layer 750 was vertically aligned in areas in which the first electrode bars E1 were formed and the second electrode bars E2 were formed. However, the liquid crystal disposed in an area between the first electrode bars E1 and the central portion C was tilted toward the central portion C.

In addition, a transmissivity measured in an area between the first and second electrode bars E1 and E2 was about 23.38%.

Referring to FIG. 12, the LCD panel 800 of the sample 5 included a first substrate 810, a second substrate 830 opposite to the first substrate 810 and a liquid crystal 850. The first substrate 810 included first and second electrode bars E1 and E2 and a first alignment layer 811. The second substrate 830 included a transparent electrode layer 831 having an electrically floating structure and a second alignment layer 833. The liquid crystal 850 had a cell gap of about 3 μm.

In the horizontal electric field, the liquid crystal of the liquid crystal layer 850 was vertically aligned in areas in which the first electrode bars E1 were formed and the second electrode bars E2 were formed. However, the liquid crystal disposed in an area between the first electrode bars E1 and the central portion C was tilted toward the central portion C.

In addition, a transmissivity measured in an area between the first and second electrode bars E1 and E2 was about 8.69%. The transmissivity of the LCD panel 800 was under 10% so that the LCD panel 800 might be not developed into the LCD.

In comparing samples 4 with 5, when the cell gap of the liquid crystal layer increased in the LCD panel having the second substrate that did not have a dielectric layer disposed between the transparent electrode layer and the liquid crystal layer, a texture was not caused between the first and second electrode bars E1 and E2 to obtain a target transmissivity.

According to the present invention, a second substrate includes a transparent electrode layer of an electrically floating structure, so that a texture may not be formed in an area between first and second electrode bars in which the horizontal electric field is formed. Thus, the spots that occur when liquid crystal is not restored to the original state when pressure is lifted may be prevented, so that image display quality may be improved.

In addition, an alignment layer includes a pre-tilt angle, so that a problem in which the response time of the liquid crystal is deteriorated by the transparent electrode layer of the second substrate may be improved.

This invention has been described with reference to the example embodiments. It is evident, however, that many alternative modifications and variations will be apparent to those having skill in the art in light of the foregoing description. Accordingly, the present invention embraces all such alternative modifications and variations as falling within the spirit and scope of the appended claims.

What is claimed is:

1. An LCD panel comprising:
a first substrate including a first pixel electrode having a plurality of first electrode bars and a second pixel electrode having a plurality of second electrode bars disposed between the first electrode bars disposed on a first insulating substrate;
a second substrate opposing the first substrate, including a transparent electrode layer disposed on a second insulating substrate to be electrically floated and an alignment layer disposed on the transparent electrode layer to have a pre-tilt angle tilted about 85° to about 90° from the second insulating substrate; and
a liquid crystal layer disposed between the first substrate and the second substrate,
wherein the first substrate includes:
a first switching element connected to a first data line and a gate line, and electrically connected to the first pixel electrode; and
a second switching element connected to a second data line adjacent to the first data line and the gate line, and electrically connected to the second pixel electrode.

2. The LCD panel of claim 1, wherein the second substrate further includes a dielectric layer disposed between the transparent electrode layer and the alignment layer.

3. The LCD panel of claim 2, wherein the dielectric layer includes a color filter layer and an overcoating layer disposed between the color filter layer and the alignment layer.

4. The LCD panel of claim 1, wherein the first and second electrode bars are formed from the same layer.

5. The LCD panel of claim 1, wherein the first electrode bars receives a first voltage and the second electrode bars receives a second voltage having an opposite phase to the first voltage.

6. The LCD panel of claim 1, wherein the first substrate includes a color filter layer, the color filter layer is disposed between the first switching element and the first pixel electrode and between the second switching element and the second pixel electrode.

7. The LCD panel of claim 1, wherein the alignment layer has the pre-tilt angle tilted about 90° from the second insulating substrate.

8. The LCD panel of claim 1, wherein the first substrate further includes an alignment layer disposed on the first and second pixel electrodes to have a pre-tilt angle tilted about 85° to about 90° from the first insulating substrate.

9. A method of manufacturing the LCD panel comprising:
forming a first substrate including a first electrode and a second electrode disposed on a first insulating substrate, the first pixel electrode having a plurality of first electrode bars and the second pixel electrode having a plurality of second electrode bars disposed between the first electrode bars;
forming a second substrate including a transparent electrode layer disposed on a second insulating substrate opposing the first substrate, the transparent electrode layer being electrically floated, and an alignment layer disposed on the transparent electrode layer;
forming a liquid crystal layer between the first substrate and the second substrate, the liquid crystal layer including a reactive mesogen; and
forming a pre-tilt angle tilted about 85° to about 90° from the second insulating substrate in an alignment layer of the first substrate and the second substrate, and the pre-tilt angle formed by irradiating the light when the liquid crystal is driven to display a white image,
wherein forming the first substrate comprises forming a first switching element connected to a first data line and a gate line and electrically connected to the first pixel electrode, and a second switching element connected to a second data line adjacent to the first data line and the gate line, and electrically connected to the second pixel electrode.

10. The method of claim 9, wherein forming the second substrate comprises forming a dielectric layer between the transparent electrode layer and the alignment layer.

11. The method of claim 9, wherein forming the first substrate comprises forming a color filter between the first switching element and the first pixel electrode and between the second switching element and the second pixel electrode.

* * * * *